June 16, 1953 — W. O. BEYER — 2,642,311

MOBILE PIPE LINE

Filed Dec. 3, 1948 — 7 Sheets-Sheet 1

INVENTOR
Walter O. Beyer
BY Green, McCallister & Miller
His Attorneys

Fig. 11

No coverage
Single coverage
Double coverage

Patented June 16, 1953

2,642,311

UNITED STATES PATENT OFFICE 2,642,311

MOBILE PIPE LINE

Walter O. Beyer, Pittsburgh, Pa.

Application December 3, 1948, Serial No. 63,332

15 Claims. (Cl. 299—47)

This invention relates to a mobile pipe line arrangement, and particularly, to a pipe line system that may be readily moved to and from a desired location and that at such a location may be swiveled or pivoted into a desired position.

A phase of my invention pertains to a serpentine pipe line arrangement made up of flexibly connected sections that may be pivoted or swiveled about each other and that may be readily moved individually or as a group from one location to another by a draft means such as a tractor.

Although a pipe line system or arrangement constructed in accordance with my invention has a large number of uses, it is particularly important in connection with irrigating relatively large areas. History has disclosed that irrigation by means of impounded areas and gravity flow channels is very expensive and is wasteful of the water supply. It also, over a period of time, tends to progressively waste the top soil. In more recent years, overhead irrigation by a pipe line or sprinkler system has been gaining recognition as a better method. The latter system, if capable of disassembly, involves a large amount of labor and expense in setting it up, in tearing it down, and in moving it from one location to another. A permanent system is very expensive, is not conducive to crop rotation practice, and tends to interfere with mechanical or power operations in sowing, cultivating, and harvesting the crops. Thus, there is a definite need for a mobile system that can be readily moved to and set up at different locations. A mobile line constructed in accordance with my invention can be used at one location, easily and inexpnsively moved to a second location, and to a number of successive locations until an entire area has been suitably moisture-conditioned.

A closed pressure system employing pipe lines not only corrects the evil of uncontrollable flood methods, but a saving of approximately 35% of the water required and a large saving in the top soil, itself. Overhead irrigation employing spray heads thus appears to be the practical approach to the problem, provided that the operation can be conducted at a reasonable expense to the land owner. I have determined that an overhead system can be made practical by employing the principles of my invention wherein pipe line sections of any standard or desired length can be moved as a flexible group by a powered mechanism or horse-drawn means from one location to another in an expeditious manner and at such a location can be swiveled to provide a maximum flexibility of utilization.

Recent developments in sprinklers for overhead irrigation have provided sprinkler heads of high capacity and long range. For example, a sprinkler unit or head can now be employed to deliver 400 gallons per minute of water, distributing it over approximately a 400 foot diameter area. Although I am able to provide a relatively light weight pipe for use in this connection that has a long period of life and that will withstand the pressures involved, yet there is a definite problem involved in transporting and handling the sections or lengths required for a given operation. For example, pipe for this purpose ordinarily has a sectional length of about 16 to 20 feet, and may have a length of 30 to 40 feet as limited by manufacturing methods and may have a diameter of about 4, 5 or 6 inches.

In accordance with my invention, I have provided each pipe line length or section with a mobile carrier means which includes a carriage that may be employed to swivel the pipe length about its mid-section. The pipe may be easily moved individually to a particular location or as one section of a plurality of flexibly connected lengths or sections by a common draft means connected to one end of an assembled group or train. Each pipe length or section of the group constituting the system is pivoted or swiveled about adjacent lengths or sections in such a manner that serpentine movement may be effected and that the group or system may be turned and moved in U-shaped and other paths as needed for transporting the system from one location to another.

The flexible sections or pipe lines which constitute a part of an overall group or system may be broken down into sub-groups or sections as desired to further facilitate their movement to a desired location, as well as their positioning at such a location. Selected sections or lengths of each group or sub-group may be provided with one or more sprinkler heads as desired. Flexible connectors are provided which permit a selected group to be connected to a source of water supply at either end thereof, and to be connected to an adjacent group at either end thereof.

I have determined that the flexible connectors may be effected by employing a coupling whose holding action is such that the holding force increases with an increase of, or in other words, proportionally to an increase of line pressure. When water under pressure has been introduced into a group, it is immaterial, at such time, whether or not one pipe length or section thereof is rigid with reference to an adjacent pipe line or section to which it is connected. The flexible or swivel action is only needed when a section or group of sections is being moved from one location to another and is being set up and connected to an adjacent section or group at such location. While this work is being done line pressure will be turned off.

I have employed a coupling unit the holding action of which is based on the principles set forth in my U. S. Patent No. 2,259,453. However, the present coupling is provided with a special means for facilitating a swiveling or turning movement between its parts when fluid pressure is cut off. The pipe sections are so mounted on their carriages and constructed in accordance with my invention as to permit sharp radius turns when they are connected and are being moved as a group.

In the drawings illustrating the principles of my invention,

Figure 1A is an enlarged horizontal sectional detail taken along the line IA—IA of Figure 1; Figure 1B is an enlarged horizontal sectional detail taken along the line IB—IB of the same figure; and, Figure 1C is a detail in elevation taken along the line IC—IC of Figure 1B;

Figures 15 and 16 are side views in elevation showing end connectors that may be employed to connect opposite ends of a pipe sectional group to a fluid supply line; Figure 15 shows a suitable connector for the pull end (right end of Figure 1) and Figure 16 shows a suitable connector for the other end (left end of Figure 1);

Figure 14:
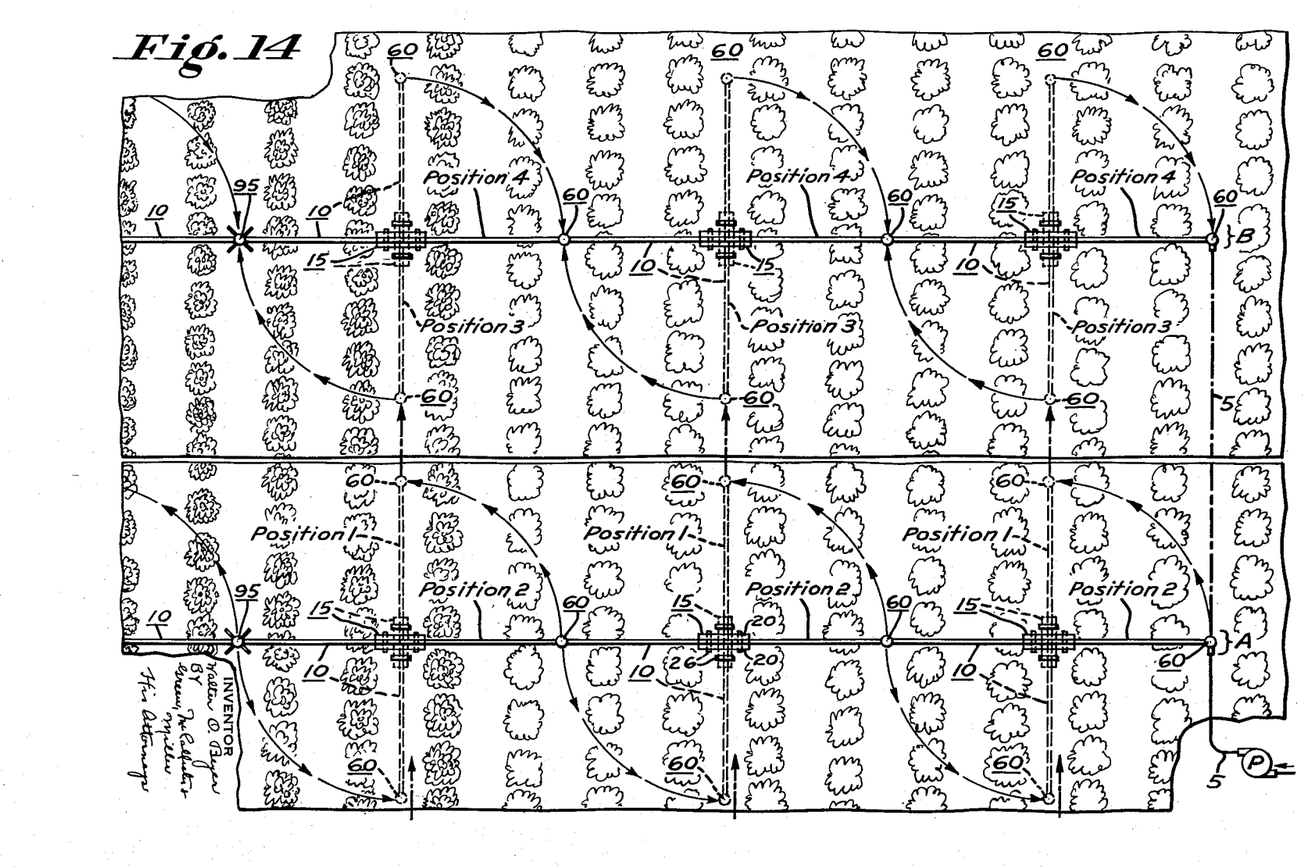
Figure 14 is a diagrammatic plan view showing how a sectional pipe group may be employed in irrigating a row crop area by moving pipe sections longitudinally to transversely-spaced-apart locations between rows, swiveling them about their carriages into transverse alignment with each other, and connecting them to form a spray group.
Figures 15, 16:
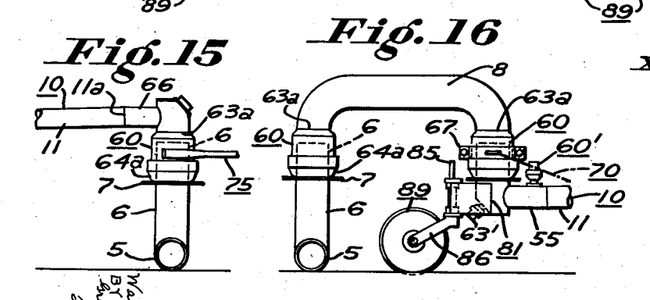

Referring particularly to Figures 11, 14, 15 and 16, I have indicated a sectional main supply line 5 into which water may be introduced by a pump from a suitable source such as a dam, a well, or any body of water. The supply line 5 is provided with coupled sections of pipe so that its length may be increased or decreased as desired for various locations of my mobile overhead system or arrangement. The discharge end of the line 5 is provided, as shown in Figures 15 and 16, with a vertically-extending elbow riser 6 provided with a flange 7 adjacent its upper end which corresponds to the annular flange 57 of the elbow or riser (male) housing part 56 of the coupling 60 shown in Figure 2. That is, the flange 7 or 57 serves as a pivot support for a turned-in lower or nose edge of an upper coupling part or housing 64 of a coupling unit 60 and prevents the male parts 6 or 56 from going too far into the female parts 63, see Figure 2. The coupling unit 60 is of a type that is employed throughout my mobile system or arrangement.

Figure 2:
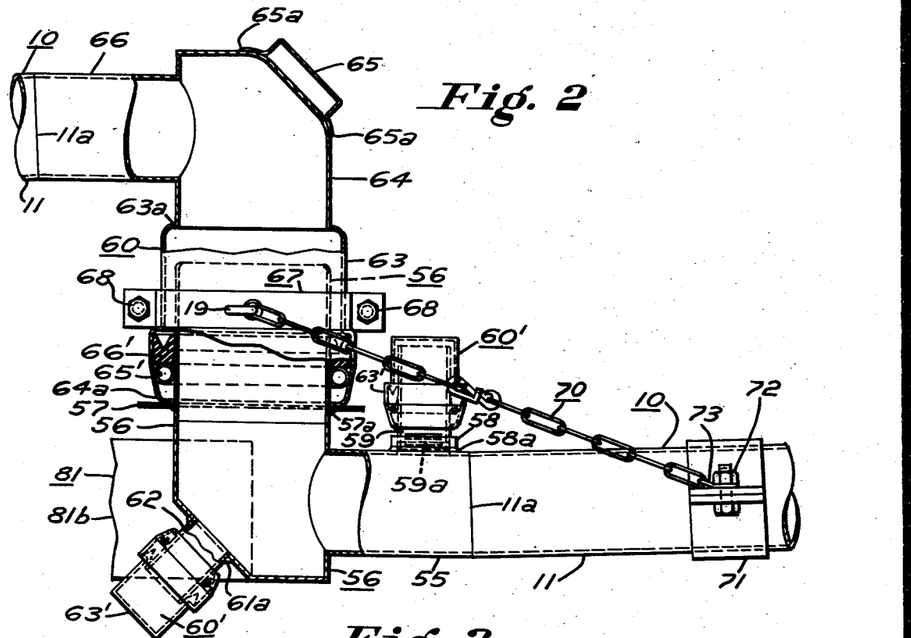
Figure 2 is an enlarged view in elevation and partial section of a connector coupling or swivel head that may be employed in the system of Figure 1.

The lower or male part of the unit is provided by the elbow or riser housing, such as 6 of Figures 15 and 16 and 56 of Figure 2. Referring particularly to Figure 15, the coupling 60 has an elbow-like housing part 66 which is welded at 11a to a pipe section portion 11 to supply hydraulic fluid to a pipe sectional group. In Figure 16 I have shown an arrangement wherein the coupling 60 is secured by a weld 63a at its upper and open end to an overhead elbow section 8. The overhead section 8 is secured by a weld 63a at its other end to a second coupling 60 that is connected to a pipe section of the group that is to be supplied with fluid.

Figure 1:
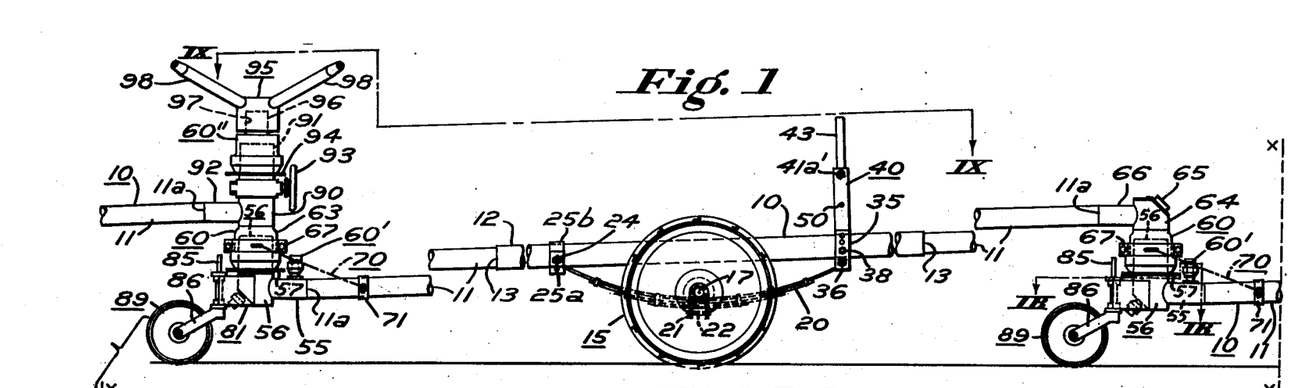
Figure 1 is a side view in elevation showing a pipe line sectional group; this group is provided with a sprinkler head, carrier means including a carriage for each section, means associated with each carriage for raising and disconnecting one pipe section with reference to an adjacent section, swivel coupling heads between adjacent pipe sections, and a coupling and draft head at one end of the group.

Referring particularly to Figure 1, I have shown a complete pipe sectional group composed of pipe sections 10. Each section 10 has two pipe end length portions 11 and a reinforced, intermediate, heavier pipe length portion 12 to which the portions 11 are welded at 13 to form a complete section. A centrally-mounted carriage 15 is secured on the pipe portion 12 and, as shown particularly in Figure 9, comprises a pair of semi-elliptic springs 20, a central axle tube 17, and tractor wheels 26. The transverse tube 17 has flanges 17a at its opposite ends that are secured to flanges 19 of transverse extension or solid subshafts 16 by rivets 18. Each of the opposite and spaced-apart springs 20 is centrally mounted on the tubular axle 17 by a pair of U-bolts 21 and a bottom clamp plate 22. Bolts 22a extend through the tubular axle 17 and the plate 22 to rigidly secure spring sections 20 on the axle.

Figure 5:
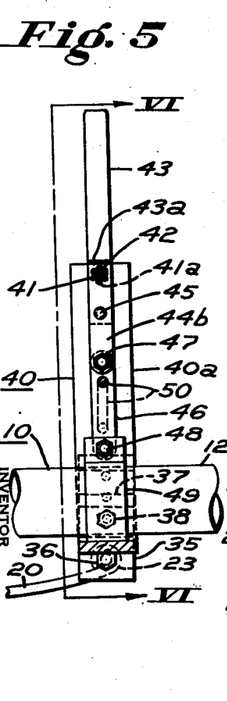
Figure 5 is an enlarged fragmental view in side elevation showing details of a lifting or pipe-end-raising mechanism for the arrangement of Figure 1 and is taken along the line V—V of Figure 6.
Figure 6:
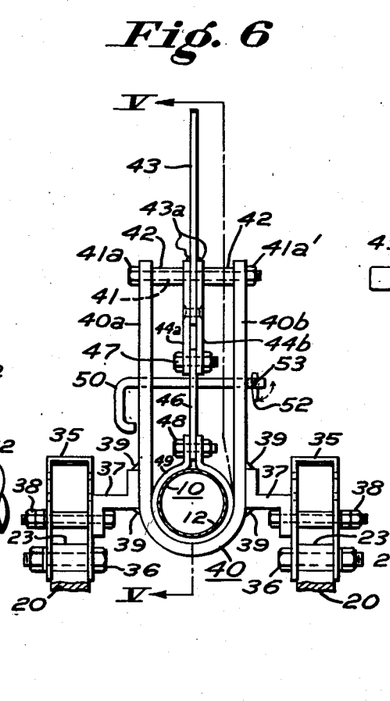
Figure 6 is an enlarged sectional view in elevation taken along the line VI—VI of Figure 5.

The opposite ends of each spring 20 are each provided with a turned-in or rolled-over annular bearing portion 23, see Figures 5 and 6. The annular portion 23 of the left-hand end of each spring 20 (in Figure 9) is mounted by a bolt, nut and lock washer assembly 24 and shackle 24a on a lower half 25a of a transversely-extending two-part support bracket 25. It will be noted that the bolts of the assembly 24 extend through opposite, vertical foot portions of the transversely-extending lower bracket half 25a. An upper bracket half 25b is secured to the lower half 25a by bolts 26a to clamp the bracket over or about the pipe portion 12.

A loose sleeve 17′ is positioned on each of the sub-shafts 16 against the abutment flange 19 and acts as a spacer between flange 19 and the inner end of an enlarged bearing mounting or hub 26′ of a tractor wheel 26. Each wheel 26 is rotatably positioned on one sub-shaft 16 by a washer and cotter pin assembly 26″. That is, each tractor wheel 26 and its hub or bearing mounting 26′ is adapted to freely rotate on the shaft 16 and its position on such shaft may be adjusted by substituting sleeves 17′ of different lengths and washers 26″ of different thicknesses. The opposite or right bearing portions 23 (in Figure 9) of the springs 20 may be mounted on a pipe raising frame by means of bolts and nut assemblies 36, U-shaped shackles or brackets 35, angle support brackets 37, bolt and nut assemblies 38, and welds 39, see Figures 5 to 8. The raising frame has a U-shaped integral bracket member 40 which is adapted to normally support the portion 12 of the pipe section 10 at its lower or normal position of Figures 5 and 6. A lever support bolt or shaft having a head 41a extends through and between upper ends of opposite and spaced-apart arm portions 40a and 40b of the bracket 40 and carries a pair of rotatably-mounted sleeves 42 thereon that extend between the arm portions 40a and 40b. A nut 41a′ is mounted on a threaded end of the bolt shaft 41 to position it and to permit the sleeves 42 to rotate thereon. The bolt shaft 41 carries a hand or operation lever 43 that is centrally spaced by the sleeves 42, and a pair of extension lever arms 44a and 44b. The lever arms 44a and 44b are at their inner ends welded at 43a to the operating lever 43, and like the latter, are pivotally mounted on the bolt shaft 41 for movement thereabout. A rivet 45 also secures one end of the operating lever 43 to the operating lever arms 44a and 44b to further strengthen the construction. The lever arms 44a and 44b at their outer ends present a bifurcated pattern to receive a lifting link 46 that is pivotally connected therebetween by a bolt and nut assembly 47. The other end of the lifting link 46 is pivotally secured by a bolt and nut assembly 48 to the flanges of a split, pipe-clamping bracket 49.

A locking key member 50 is adapted to extend through the arm portions 40a and 40b of the frame member 40 and through a hole in the lifting link 46 to positively lock the lifting mechanism in its "down" position shown in Figures 5 and 6. A latch finger 52 is pivotally mounted by a pin 53 adjacent an outer end of the key member 50 to prevent the key from being accidentally knocked out when it has been inserted.

Figure 7:
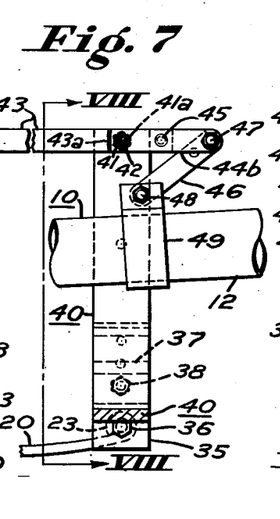
Figure 7 is an enlarged fragmental side section in elevation of the mechanism of Figures 5 and 6 and showing it in a raised position; this view is taken along the line VII—VII of Figure 8.
Figure 8:
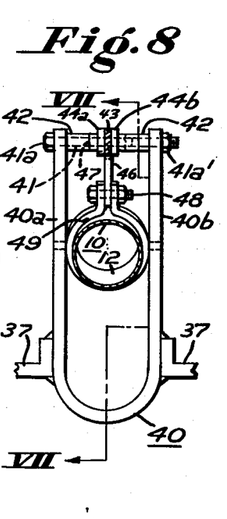
Figure 8 is an end section taken along the line VIII—VIII of Figure 7.

In Figures 7 and 8 I have shown the positioning of the parts of the lifting mechanism when the finger 52 of the key member 50 has been turned so that it aligns with the axis of such key, the key member has been withdrawn and the operating lever 43 has been moved downwardly about the bolt shaft 41 to raise the lever arms 44a and 44b, the link 46, the bracket 49, and the pipe section 10. For an average length of pipe section of 30 to 40 feet, a 4 inch rise of the pipe 10 as effected by the lifting mechanism 40 will cause the left end of the pipe to raise about 8 inches or more, see Figure 4. In this manner, the upper end of each inclined pipe section 10 may be mechanically lifted out of a coupled relationship with respect to the riser head of a lower end of an adjacent pipe section when the fluid pressure has been shut off. That is, the female part 63 of the coupling 60 may be lifted out of a male part 56 thereof, see Figures 2 and 3. Although this operation can be effected manually and the lifting device eliminated by connecting both ends of the springs 20 in the manner shown in Figure 9B, I prefer to utilize such a device where the pipe sections 10 are relatively long or heavy.

Figure 3:
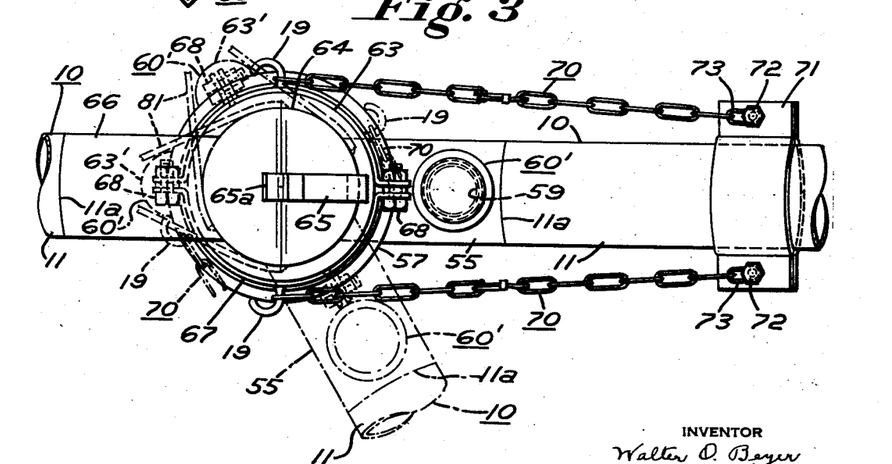
Figure 3 is a top plan view of the head of Figure 2 and on the same scale.
Figure 4:
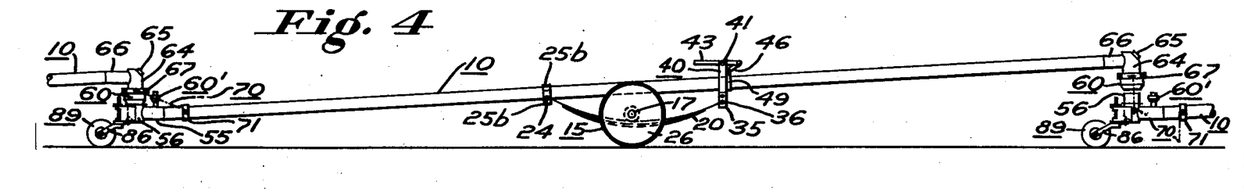
Figure 4 is a reduced diagrammatic view in side elevation of an intermediate pipe section which may be employed with a system or group such as shown in Figure 1 of the drawings.

In Figures 2 and 3, I have shown how each pipe section 10 may be connected at one end to a riser head, or in other words, how upper and lower parts of the couplings 60 may be connected together in a fluid-sealing off relationship. The pipe end portion 11 is shown welded to a nipple 55 of an elbow or riser housing (lower coupling part) 56. A horizontal annular flange 57 is secured about the housing 56 by weld metal 57a to form a swivel support for the upper or female part 63 of the coupling 60. A mounting flange 58 which is open to the nipple 55 and is welded thereto at 58a, is provided with internal threads to receive a short length pipe stud section or male coupling part 59. The part 59 is open at its upper end and is provided with threads 59a adjacent its lower end to secure it within the flange 58. A female coupling housing 63′, similar to the housing 63 of the coupling 60, except that its upper end is closed off, is slid down over and positioned on the short length pipe stud 59 to close it off.

Figure 19:
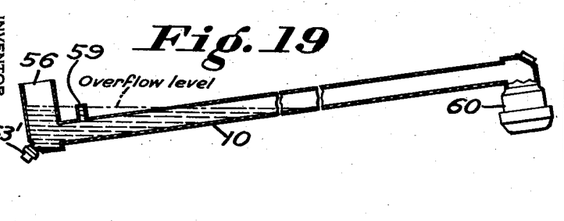
Figure 19 is a fragmental side sectional view in elevation through a pipe length or section in its mounted position and disclosing how fluid in the section may be utilized to lower its center of gravity and prevent it from overturning when it is rounding curves during a train or group movement.

When the pipe section 10 is being moved and swiveled, the upper part 63′ of the coupling 60′ may be removed to permit fluid to flow out of the opening in the pipe stud 59 until it reaches the level indicated in Figure 19. This provides a water ballast and further lowers the center of gravity of the pipe section 10 towards its lower end.

As shown in Figure 2, a drain is mounted on the front end of the elbow housing or lower coupling part 56 by means of a short length, open-end pipe stud section (male coupling part) 62 and weld metal 61a. A female coupling half or part 63' having a closed end may then be slidably pushed on the pipe stud 62 to close it off.

As shown in Figure 2, the coupling 60 is provided with an enlarged outer housing wall or female part 63 that is adapted to extend over a male pipe or housing part or elbow-extension 56. The female part 63 has a turned-in nose 64a adjacent its further enlarged lower end portion that is adapted to pivotally rest upon the swivel flange 57. An annular resilient gasket 66' of rubber or other suitable material is positioned within the inside of the further enlarged portion of the part 63 and is adapted to lie adjacent an outer surface of the wall of the male part 56. The gasket 66' is shown provided with a V-shaped chamber, so that it will expand radially between the parts 63 and 56 and axially towards a flexible ring locking annulus 65' when fluid pressure is applied to the pipe line. In other words, the gasket 66' seals off the coupling 60 and its pressure heel applies a locking force to the locking annulus 65' that is proportional to the pressure of the water in the pipe line. As a result, the coupling has a minimum holding force when fluid flow is shut off and has a proportional sealing and member-holding force when the fluid is flowing.

In Figure 2, the upper portion of the female coupling housing 63 is open and is connected to a header housing 64 by weld metal 63a. A handle 65 of U-shape is shown mounted on the header housing 64 by weld metal 65a. The header housing 64 has a nipple 66 to which the end portion 11 of the pipe section 10 is welded at 11a to form a unitary construction.

To further reinforce the header, riser or elbow unit with reference to the pipe section 10, I have shown a diagonal hitch which comprises a two-part clamping bracket 67 which is loosely positioned about the female housing 63 of the coupling 60 by clamping bolt and spacer-washer assemblies 68. That is, the bracket 67 is mounted to permit the part 63 of the coupling 60 to freely turn or swivel with reference thereto. Each half of the hitch bracket 67 is provided with a hook finger 19 adapted to receive a diagonal chain 70. The chain 70 at its other end is secured by a ring or link 73 to a two-part, pipe section-gripping bracket 71 by bolt and nut assemblies 72. When the female part 63 of the coupling 60 is to be removed from the male part 56, the chain 70 may be unhooked from the fingers 19.

Figures 1A, 1B, 1C:
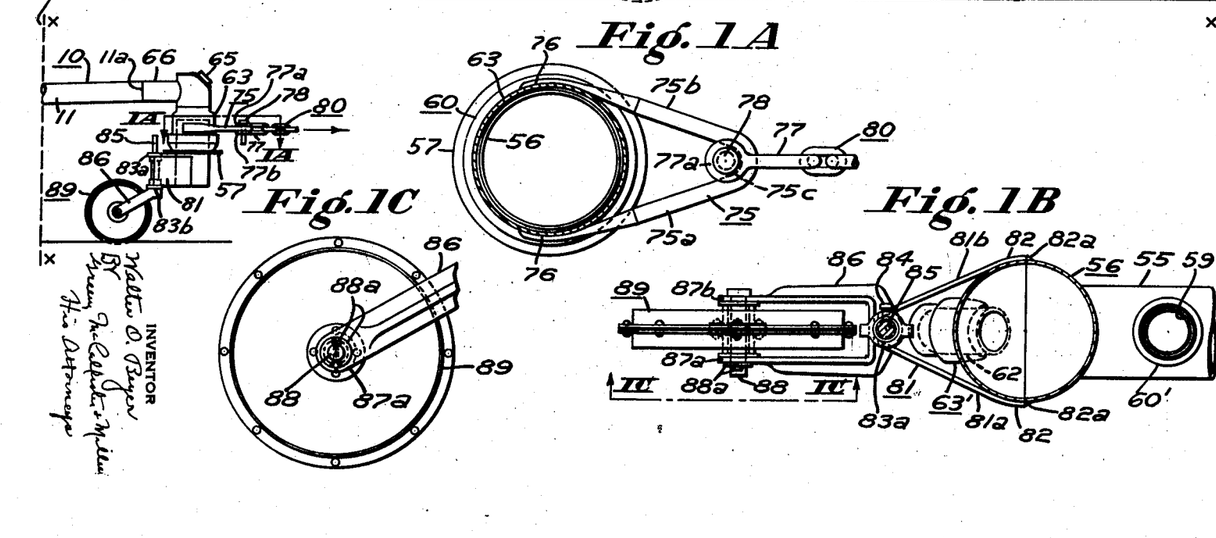

In Figure 1A, I have shown a draw hitch 75 for connecting a tractor or draw means to the male coupling part or elbow housing 56 of the last pipe section of a sectional group, see also the right end of Figure 1. The draw hitch 75 is provided with a V-shaped mounting bracket having a pair of backwardly extending arms 75a and 75b. The arms at their backwardly-extending ends are curved to fit against the circular female housing 63 of the coupling 60 and are rigidly secured thereto by weld metal 76. The forwardly-extending or converging ends of the arms 75a and 75b are integrally connected and support a U-shaped clevis link 77. The clevis link 77 is provided with a pair of bearing eye portions 77a and 77b through which a pivot pin 78 is adapted to extend as well as through an integral eye portion 75c of the bracket 75. The U-shaped clevis link 77 is adapted to loop through a link of a draw chain 80. The pivot pin 78 is, of course, removable to connect the draw chain 80 when a pipe sectional group is to be moved and to disconnect the chain after the pipe sectional group has been moved to a desired location.

In Figures 1B and 1C, I have shown a follower or caster wheel unit 81 (part of the carrier means for each pipe section 10) of a type that may be mounted at opposite ends of the pipe section upon the elbow housing on the male coupling part 56. This unit has an integral V-shaped mounting bracket provided with a pair of mounting arms 81a and 81b that diverge and are shaped or curved at one end 82 to fit on the housing 56 and to be secured thereon by weld metal 82a. The arms 81a and 81b converge into an integral pin-mounting eye bearing portion 83a and 83b at an opposite end, see the right hand end of Figure 1. The eye bearing portions 83a and 83b pivotally carry a caster wheel swivel pin 85 that extends upwardly from a closed end of a bifurcated caster or wheel bracket member 86, see Figures 1B and 1C. A locking bolt 84 extends through the upper bearing portion 83a and engages an annulus slot in the pin 85 to rotatably secure the pin in position, see Figure 1B. The wheel bracket member 86 is provided with shaft-receiving portions 87a and 87b through which a shaft 88 extends and to which it is secured by a washer and cotter pin assembly 88a. A flanged caster or follower wheel 89 is rotatably mounted on the shaft 88.

It will thus be apparent that the wheel 89 and its support bracket member 86 clear the lower end of the pipe section 10 and that their swivel pin 85 is free to swivel or turn 360° about the mounting bracket arms 81a and 81b. This facilitates the serpentine movement of a pipe line sectional group when the group is being moved to a desired location and also facilitates the swiveling of a particular pipe section 10 of a group about its central carriage 15 to suitably align or position it at a given location. Although Figure 1B is shown taken through a right hand end of a pipe section 10, it will be seen that the same type follower or pulley unit is used adjacent the opposite end of each pipe section 10, see Figures 1 and 4.

In Figures 15 and 16 I have disclosed two types of adapter-connectors, the type of Figure 15 is suitable for a right end connection to a pipe sectional group, while the type of Figure 16 is suitable for a left end connection to a pipe sectional group.

Figure 17:
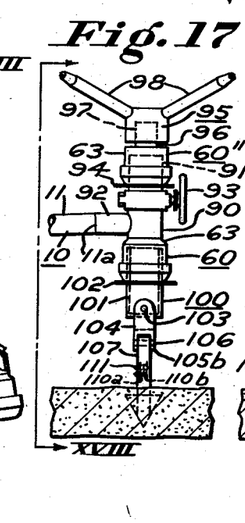
Figure 17 is an enlarged side view in elevation showing a wheelless type of support for an end of a pipe section provided with a spray head.
Figure 18:
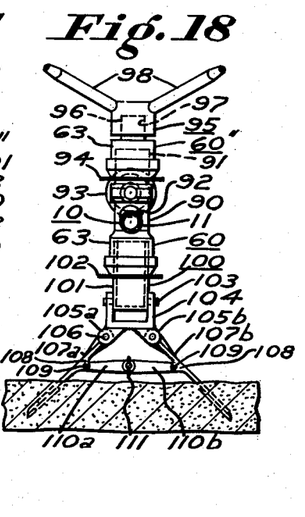
Figure 18 is an end view in elevation taken along the line XVIII—XVIII of Figure 17.

In Figures 17 and 18, I have disclosed a wheelless or ground anchor type of support for a spray or sprinker head, such as 95. The sprinkler head unit 95 and its assembly is provided with a coupling 60, so that it may also be used with a caster wheel type of mounting, such as shown in Figure 1B or in the wheelless or ground anchor type shown in Figures 17 and 18.

Referring particularly to Figures 1, 17 and 18, I have shown an open-end male coupling or extension housing part 91 which is welded at its lower end to an open end of the female part 63 of a coupling 60 of the type previously described. At its upper end, the part 91 provides the male part of a second coupling 60" of the same general type as 60. The duo or double coupling arrangement permits the spray head 95 to be disconnected from a special riser head 90, and the latter, from an anchor head 100 of Figure 17 or a caster head, such as shown at the left end of Figure 1 of the drawings. A nipple 92 extends transversely from a side of the housing part 91 of the special riser head 90 and is welded to an end portion 11 of a pipe section 10 by weld metal 11a. Any suitable ordinary type of shut off and control valve 93 is mounted on the housing part 91 for controlling fluid flow to the sprinkler head 95 and for shutting off flow when the sprinkler head is to be removed.

The housing 90 also carries an annular flange 94, similar to the flange 57 of Figure 2, which is adapted to receive a female housing part 63 of the coupling 60″. The coupling unit 60″ at its upper end carries a welded-on short length pipe stud section 96 that fits within a bore 97 of the sprinkler head 95. The sprinkler head 95 may, as shown, be secured on the pipe section 96 to provide unitary construction with the female housing part 63 of the coupling 60″ and carries a series of outwardly and upwardly projecting spray nozzles 98. It will thus be apparent that the spray head 95 and the coupling 64″ constitute a unit which can be mounted on any suitable male housing part, such as 91.

Referring particularly to Figures 17 and 18, it will be noted that the assembly, as a whole, has two couplings 60 and 60″ which are of the same type as the coupling 60 shown in Figure 2, and each of which is adapted to pivot or swivel about a support flange, such as 102 and 94. The anchor unit 100 is provided with a pipe sector 101 that is preferably closed off at its ends and carries an annular coupling flange 102 that corresponds to the flange 94 of Figure 1 and to the flange 57 of Figure 2. A U-shaped downwardly projecting bracket or yoke 104 is pivoted on a lower end of the closed-off pipe sector 101 by a pin 103 which extends therethrough. The opposite lower corners of the bracket 104 have integral lugs 105a and 105b that extend therefrom and on which anchor fingers 107a and 107b are pivoted by pins 106. Each anchor finger is provided with an inwardly projecting lug portion 108. Pins 109 pivotally mount scissors arms 110a and 110b on the lugs 108. The scissors arms 110a and 110b are pivotally connected together at their inner ends by a wing nut assembly 111, so that they may be moved upwardly and downwardly thereabout to adjust the transverse spread of the anchor fingers 107a and 107b. The anchor unit 100 can be removed after a sprinkling operation has been completed by raising the pipe section 10 and the special housing 90 off the pipe sector 101 by employing the lifting mechanism illustrated in Figures 5 to 8, inclusive. The bracket 104 and the parts carried thereby can be swung up on the pin 103 out of the way and tied in position by a wire or cord when the pipe section is being moved to moved to a new location.

Figure 11:
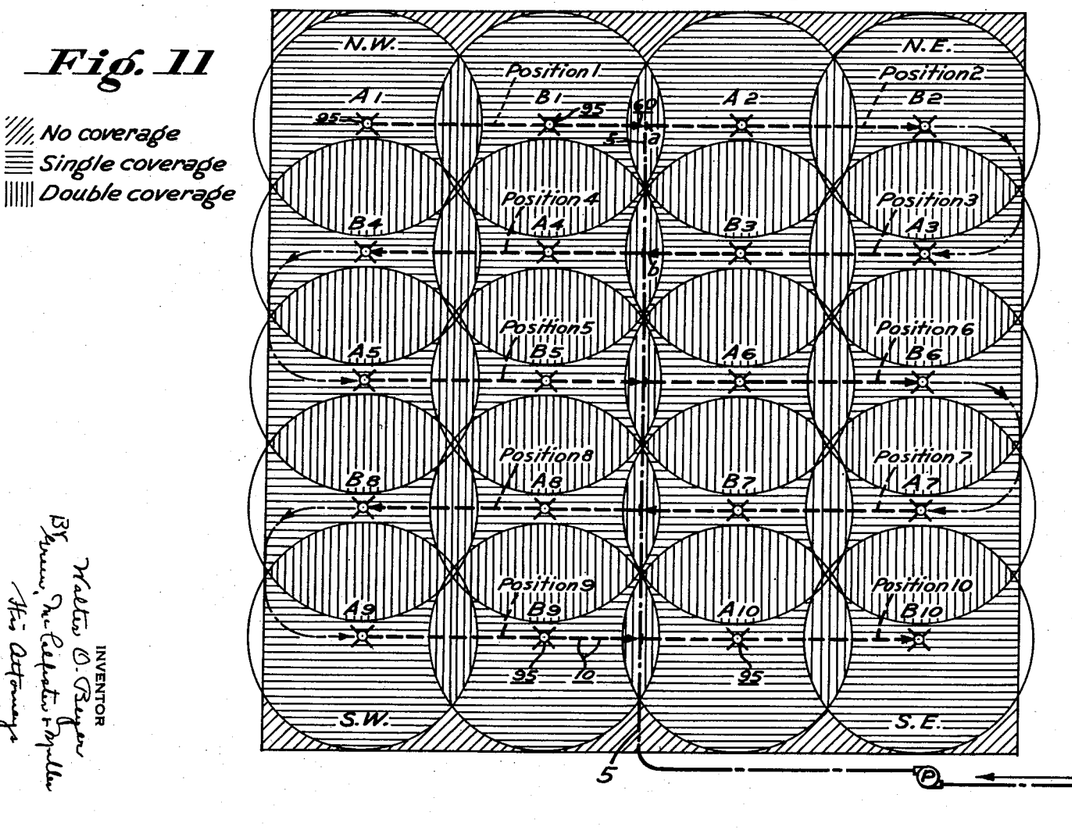
Figure 11 is a diagrammatic plan view of a 40 acre sowed field indicating train positioning and sectional group movement in effecting moisture coverage of the area. In this diagram I have indicated ten positions for a pipe section group; the sprinkling operation is shown as initiated at the NW. corner of the figure and as finished at the SE. corner thereof.
Figure 12:
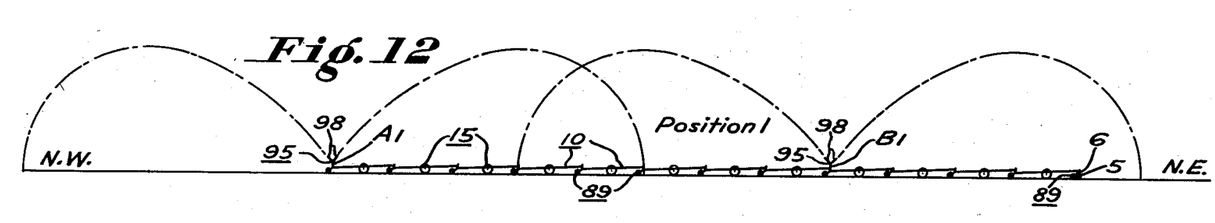
Figure 12 is a somewhat diagrammatic, enlarged, side elevational diagram showing the pipe group in position 1 of Figure 11.
Figure 13:
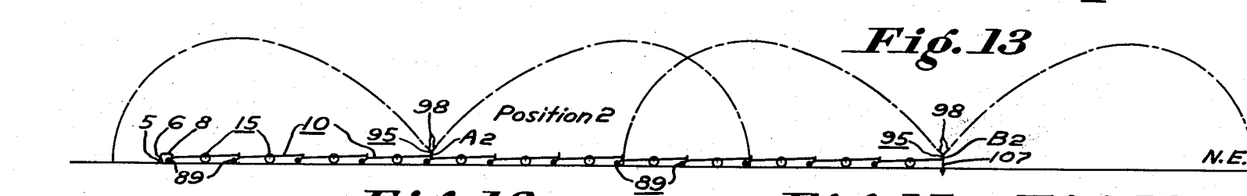
Figure 13 is a view similar to Figure 12 but shows the group at position 2 of Figure 11.

In Figure 11, I have somewhat diagrammatically illustrated a method of employing a pipe line arrangement of my invention in irrigating sowed fields, for example. It also has been used in connection with row crops where the rows run from left to right in the diagram; in such case, the pipe sectional group extends longitudinally between crop rows. The diagram represents a forty acre field of 1320 square feet. In this diagram, the sprinkler heads A-1, B-1 are of the type to provide approximately a 400 ft. diameter spread of moisture. This view should also be considered in connection with Figures 12 and 13. In starting the operation, see position 1, a pipe sectional group as represented by dash lines, is assembled and may have two spray heads A-1 and B-1. The pipe section group at this position may be connected to a water main 5 at its right hand end by an adaptor connector such as shown in Figure 15.

After the N. W. upper area of the field has been sprinkled, the right hand end coupling 60 of the pipe line sectional group may be disconnected by utilizing the lifting mechanism of Figures 5 to 8 and a tractor or draft means is connected to the hitch unit 75 of the riser head of a left hand end of the pipe sectional group, see Figures 1, 1A and 15, and the sectional group is pulled or hauled transversely to a N. E. position 2, where the sprinkler heads $A_1$ and $B_1$ are represented as $A_2$ and $B_2$, respectively. At this location, the left hand or opposite end of the pipe sectional group may be connected at $a$ to the water main 5 by a type of adaptor connector such as shown in Figure 16; and, the opposite end of the pipe group is closed off by inserting a male closed-off pipe segment or part into its coupling 60. The water is then turned on and after the sprinkling operation has been finished, the adaptor connector of Figure 16 is removed, and the tractor or draft means is hitched to the right hand end of the pipe group. The pipe group is then moved in a serpentine direction, as indicated by the dot and dash arrows, so that sprinkler heads $A_1$ and $B_1$ are represented as $A_3$ and $B_3$, respectively, see position 3. The then left hand end of the pipe group is connected at $b$ by a suitable adaptor connector, such as shown in Figure 16 to the water main 5.

From the above description, it will appear that the pipe group is moved from left to right across the field transversely in line and is then moved down to a lower line and transversely from right to left across the field. The operation is continued in the same manner as indicated by the various positions of the sprinkler heads (see $A_4$, $B_4$ to $A_{10}$, $B_{10}$). Thus, a field may be completely sprayed in this manner by about ten operations. It will also be noted that the draft means hitches to the same end of the pipe group and the latter is pulled from one position to the next position, regardless of whether the new position is in line with a previous position or on a new line which is being initiated.

In Figure 14 I have somewhat diagrammatically shown how mobile pipe sections 10 of my invention may be utilized in sprinkling row crops. In this view, the sprinkling operation is started at position 2 in the lower portion of the field and is finished at position 4 in the upper portion thereof. The dash-represented positions 1 and 3 of this figure illustrate how individual pipe sections 10 or sub-groups may be moved longitudinally between crop rows (see the broken lines) on their carrier means, while the arrows show how each section 10 or sub-group may be swiveled on its central carriage to a transverse position at which they are connected together by their couplings to form a spray group, see the full line positions 2 and 4. After a spraying operation has been completed at A, for example, the pipe sections 10 or their sub-groups are disconnected and swiveled back into the dash positions in line with the crop rows; they are then moved longitudinally by hand or by a drag unit to a second location B where they are swiveled, connected, and again utilized. The pipe line sections 10 are connected together by couplings 60, and at their extreme right group end, to a water main 5 by an adaptor connector such as shown, for example, in Figure 15.

From the above illustrated embodiments of my invention, it will be apparent that I have provided a highly flexible, mobile type of pipe line arrangement, system or train whereby any requirements as to fluid supply can be readily met. The pipe sections 10 may be moved on their carrier means individually, by sub-groups, or by groups to any desired location. At such a location, the individual pipe sections may then be swiveled about their carriages 15 to provide them with a final desired positioning.

It will also be apparent that a system or arrangement of my invention has many other uses and applications; for example, it may be employed in rural districts in connection with fire-fighting operations or at any place where a highly mobile utilization of pipe sections is desired. It also makes possible the employment of a minimum amount of pipe in spray-covering a maximum area. It is comparatively inexpensive and is practical in its utilization. The swiveling of each pipe section 10 about its carriage and the swiveling of each pipe section with reference to adjacent connected pipe sections provides a high flexibility of utilization.

Referring particularly to Figure 19, when a pipe section 10 or a connected group of pipe sections is being moved from one location to another, I have found that tilting can be minimized when sharp turns are to be made by removing the female housing part 63' of the coupling 60', see Figure 2, and permitting the water to seek the overflow level shown in Figure 19. This centralizes the water in a particular pipe section 10 adjacent its lower end to lower its center of gravity. After the water level indicated has been obtained, the female housing part 63' is then replaced on the male part 59.

In accordance with my invention, I provide a pipe section that is mobile from the standpoint that it is provided with carrier means for moving it from one location to another and the carriage part of such carrier means is so designed that the section may be swiveled or turned substantially centrally thereabout. The wheel size and axle positioning of the carriage 15 can be varied to clear crop rows, if desired. Each pipe section 10 is also so positioned on its carrier means that it has a gradient between its opposite ends. This gradient serves three principal purposes; in the first place, it facilitates the connection of one pipe section to adjacent pipe sections, in the second place, it facilitates a swiveling of one pipe section about its carriage part 15, and in the third place, the center of gravity of the pipe section is close to its lower end.

Each end of the pipe section is provided with a riser fitting which may be in the form of an elbow, coupling, or a pair of couplings. Normally, the fitting is so designed that its upper end is adapted to be connected to the higher end of one pipe section and its lower end is adapted to be connected to the lower end of an adjacent pipe section. The upper and lower ends of two adjacent pipe sections are provided with coupling halves of a type such that the coupling half of an upper end may be lifted out of the coupling half of the lower end of an adjacent pipe section by means of a jack or lifting frame constructed and arranged to pivot or lift the pipe section with reference to or about its carriage 15, and in such a manner, as to amplify the effective distance of lift adjacent the higher end of the pipe section. It will be noted that the pipe sections may be turned a full 360° about each other on the longitudinal or vertical riser axis of the coupling halves.

I also preferably provide each end of the pipe sections with a caster wheel, rigging, or shackle mounting associated with its riser, that with the substantially intermediate or centrally located carriage 15, constitutes the carrier means therefor.

I have also provided various types of pipe end, elbow riser, or coupling fittings such that one pipe section can be connected at its ends to an adjacent pipe section, to a main supply line or conduit, to an anchor mounting, and/or to a spray head or fitting.

By reason of the described construction of pipe or conduit sections, I can provide an articulated assembly or pipe line group arrangement that may simulate a snake or train. In addition, I have shown a hitch fitting for an end riser to which a drag unit or tractor may be connected to move the articulated assembly or arrangement, snake, or train in a desired manner to a desired location. At such desired location, the individual pipe or conduit sections may be separated and further swiveled to provide additional flexibility as to their final positioning.

The various fittings insure a fitting for any need which may arise in the field; and in this connection, I have shown representative fittings that are particularly suitable where fluid-conducting sections are to be employed in spraying crops, etc. As will be appreciated, the spray head fittings may be dispensed with entirely and the pipe sections utilized as hydraulic conductors or conduits to supply a fluid such as water at some distant location from a source of supply, and particularly, where the location of dispersal or discharge is a variable or a temporary one. A mobile assembly or system constructed in accordance with my invention can be provided with dispensing nozzles at any desired location therealong having a capacity depending upon the available fluid supply and its pressure.

Generalized briefly, it will thus appear that I have been able to provide a mobile fluid conduit system, wherein the individual unit parts thereof can be connected in series progression and can be moved from one location to another as an articulated train. Although I prefer to effect such movement by a pulling action, a pushing force can also be employed. Ordinarily however, I have found the direction of movement can be better controlled by utilizing a pulling force. My system may be said to consist of a number of hinged sections that can be quickly connected and disconnected with reference to each other and with reference to various desired types of fittings. The pipe sections are interchangeable so that their order in progression may be altered. Flank and frontal movements can be effected as required.

Each riser fitting preferably has a swivel or hinge type of coupling. Analyzed further, the coupling comprises a female housing part provided with and supporting a resilient, chambered gasket or washer of a piston-acting type which co-operates with a spring-like grip annulus element. Both the gasket and the annulus are adapted to co-operate with a second or male housing part of the coupling which may be a simple plug or a short length pipe section, stud, or nipple that fits somewhat loosely within the female housing part. Under normal conditions when no fluid pressure is applied, the spring-like annulus holds the second-mentioned coupling part within the housing of the first-mentioned part with a minimum holding force such that one coupling part may be pulled, raised, or lifted out of or separated from the other coupling part.

Fluid pressure exerted upon the chambered portion of the gasket or washer causes it to expand and positively seal off the connection between the two parts of the coupling; its pressure heel forces the grip annulus into tight engagement with adjacent surfaces of the coupling parts to provide a strut-like holding action that positively prevents separation of the two coupling parts and offsets any tendency of such parts to separate with an increase of fluid pressure. That is, the holding action of the flexible grip annulus is so magnified by a fluid pressure application that the coupling parts are held tightly together with a large margin of safety and without slippage. One coupling part is provided with a swivel flange or collar support which extends outwardly therefrom and which is adapted to receive a nose portion of the other coupling part in such a manner that the two parts are capable of a swivel or pivot rotation with respect to each other when no fluid line pressure is being applied.

Figures 9, 9A, 9B:
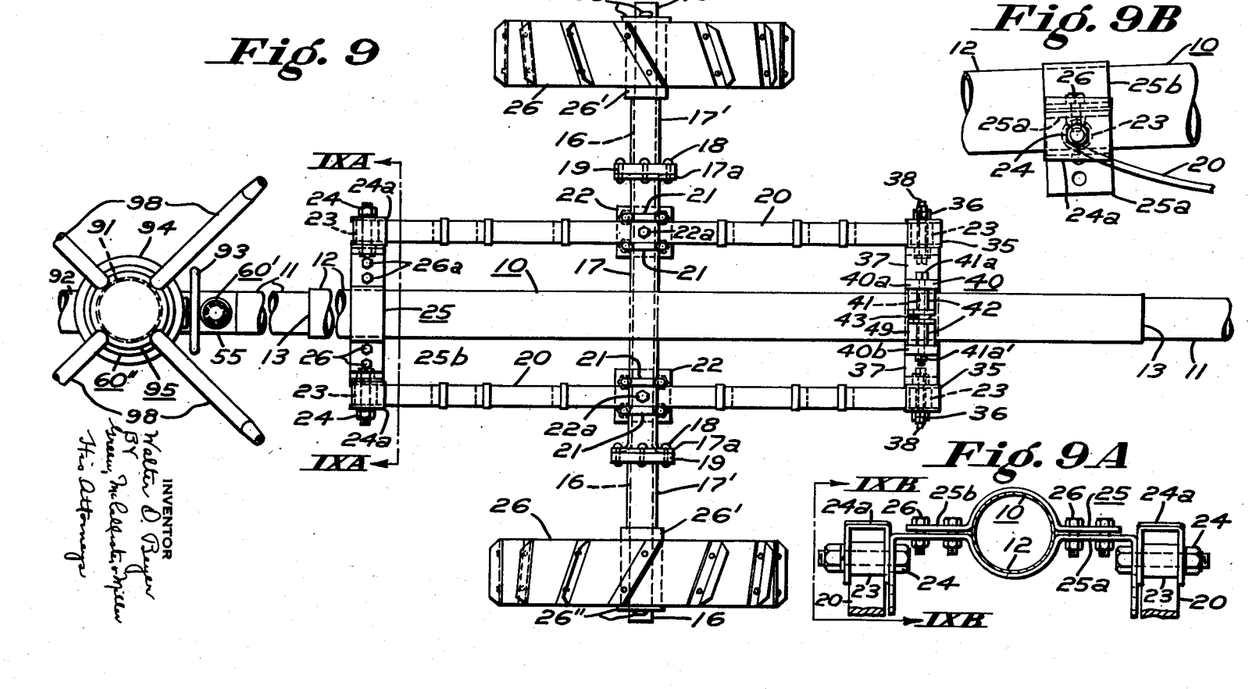
Figure 9 is an enlarged top plan view showing the construction of a carriage for each pipe or section employed in a system such as disclosed in Figure 1; this view is taken along the line IX—IX of Figure 1.
Figure 9A is a slightly enlarged horizontal transverse section, taken on line IXA—IXA of Figure 9, and showing spring mountings, etc.
Figure 9B is a slightly enlarged side fragmental view taken on the line IXB—IXB of Figure 9A.
Figure 10:
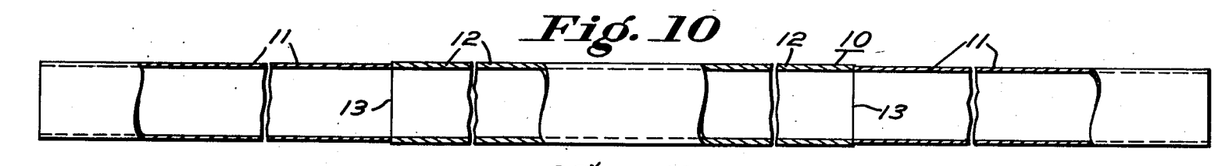
Figure 10 is an enlarged side view in elevation and partial section through a pipe length or section that may be employed in connection with my invention. The pipe section is shown reinforced centrally to provide a mounting for the carriage of Figure 9.

A pipe section and carriage assembly such as shown in Figure 9 of the drawings can also be used for carrying a number of ordinary pipe lengths by placing them on the spring carriage parallel to the pipe section 10 and securing them in position by a wire or a chain, such as 70 of Figure 2. The spacing of the wheels 26 of the carriage may be varied by employing different sizes of sleeves 17' and washers (or sleeves) 26'' and different size wheels can be employed in order to, if desired, permit a pipe section and carriage assembly to straddle a crop row. In such a case, a front caster wheel 89 may ride on an opposite side of the crop row with respect to the back caster wheel, or both may ride on the same side of the crop row, if one carriage wheel 26 is mounted closer to the tubular axle 17 than the other wheel. The coupling parts 65 and 66, see Figure 2, are preferably somewhat loosely fitted between the male part 56 and female part 63, so that such parts can be readily pulled apart without turning them with respect to each other.

Ordinarily vegetable growers provide lanes or transverse paths and these lanes can be so spaced as to conform to the throw area of the sprinklers used. Thus, a connected group of pipe sections of my invention may be employed by moving them from one location to another in a serpentine manner to effect a paneling coverage of the area. Sleeves of various lengths, corresponding to the sleeves 17', may be used instead of or interchangeably with the washers 26'' in the carriage arrangement of Figure 9 of the drawings. In another application of my invention, a combustible fluid may be supplied and the spray heads may be employed as burners for preventing frost damage.

What I claim is:

1. A mobile pipe line arrangement which comprises, a pipe section having a reinforced central portion, a wheeled carriage mounted on said reinforced central portion, a lifting mechanism operably connected between one end of said carriage and said pipe section, and said lifting mechanism being constructed and arranged to lift one end of said pipe section on the other end of said carriage, said one end of said pipe section being provided with a lift-out type of fluid coupling.

2. An arrangement as defined in claim 1 wherein, the other end of said pipe section is provided with a coupled-on spray head.

3. A mobile pipe line arrangement employing a plurality of pipe sections which comprises, a plurality of pull-out-release swivel couplings each of which has a male riser coupling part secured on one end of each of the pipe sections and a female riser coupling part secured on an opposite end of each of the pipe sections, carrier means positioning each of the pipe sections, said male riser part of each of said sections being constructed to interfit and couple within said female riser part of an adjacent pipe section and seal-off fluid flow therebetween, and means to raise and lower the one end of each of the pipe sections on its said carrier means to move its said male riser part into and out of a coupled relationship with said female riser part of an adjacent section.

4. An arrangement as defined in claim 3 wherein, each of the pipe sections is mounted on a gradient by its said carrier means and has a riser elbow between one end thereof and its said male riser coupling part and a riser elbow between the other end thereof and its said female riser coupling part.

5. An arrangement as defined in claim 3 wherein, one of said interfitting coupling parts has a swivel support flange and the other of said interfitting coupling parts has a swivel nose portion constructed and arranged to rest on said support flange.

6. An arrangement as defined in claim 3 wherein, one end of one said pair of sections is provided with a hitch means for connecting it to a drag unit to move it from one location to another.

7. A mobile pipe line construction having a longitudinal pipe section to be detachably connected at an end thereof to an end of an adjacent pipe section, a carrier means on which the longitudinal pipe section is mounted for moving it from one location to another, a two-part pull-out swivel riser coupling having one part secured on the end of the longitudinal pipe section and having its other part secured on the end of the adjacent pipe section, and said carrier having means to actuate the one end of the longitudinal pipe section and move its said coupling part into and out of a coupled relationship with said other coupling part and connect and disconnect the two pipe sections.

8. A mobile pipe line arrangement as defined in claim 7 wherein, the longitudinal pipe section is mounted intermediate its opposite ends on said carrier, said carrier positions the longitudinal pipe section on a gradient extending from its opposite ends, and the end of the longitudinal pipe section on which said one coupling part is secured is the higher end of its opposite ends.

9. A mobile pipe line construction having a longitudinal pipe section to be detachably connected at an end thereof which comprises, a mobile carriage for the longitudinal pipe section, means tiltably mounting the pipe section intermediate its opposite ends on said carriage, and an actuating mechanism operatively mounted on said carriage and connected to the pipe section to move such end thereof about said means.

10. A mobile pipe line construction as defined in claim 9, wherein said lifting means has means to normally position the pipe section on a gradient declining from such end thereof, and said actuating mechanism has means to raise such end and increase the gradient of the pipe section.

11. A mobile pipe line construction having a longitudinal pipe section to be detachably connected at its opposite ends which comprises, a mobile carriage for the longitudinal pipe section, means tiltably mounting the pipe section on said carriage, a pair of pull-out-release swivel couplings, each of which has a male riser coupling part and a female riser coupling part, the male riser coupling part of one of said couplings being secured on one end of the pipe section and the female riser coupling part of the other of said couplings being secured on the other end of the pipe section, and a tilting mechanism operatively mounted on said carrier and connected to the pipe section to tilt the pipe section on said means and pull its said male and female coupling parts out of a coupled relationship with the other coupling parts of said pair of couplings.

12. A mobile pipe line arrangement as defined in claim 11 wherein, an earth anchor has a second pull-out part of one of said couplings, and said second pull-out part is positioned to interfit with the pull-out part of the same said coupling that is mounted on said pipe section.

13. A mobile pipe line arrangement which comprises, a longitudinal pipe section, a wheeled carriage having one end secured to pivotally support an intermediate portion of said pipe section, a lifting mechanism operatively connected between said pipe section and an opposite end of said carriage to raise and lower said pipe section adjacent one end thereof, a swivel coupling having a pull-out part mounted on said last mentioned end of said pipe section, and said lifting mechanism being pivoted to raise said pull-out part out of said coupling.

14. An arrangement as defined in claim 3 wherein, said carrier means positions each said pipe section on a gradient that slopes downwardly towards one end of each of said pipe sections upon which said coupling part is mounted, and an overflow portion is positioned in each said pipe section adjacent said coupling part to provide fluid drainage from an opposite-upper end of each of said pipe sections.

15. In a mobile pipe line of the type described employing a pair of longitudinal groups of pipe sections, each pipe section of which has a fluid spray means, the method which comprises, swivel-connecting together the pipe sections of each group of the pair of groups, pulling the connected sections of one group longitudinally to a desired location, pulling the connected sections of the other group longitudinally to a desired transversely-spaced location with respect to the first-mentioned group, flowing fluid through the connected sections of said groups and spraying an area determined by the location of said pair of groups, disconnecting the sections of each group with respect to each other, swiveling each section intermediate its ends to a position at substantially right angles to its former connected location, connecting transversely-aligned sections of the two groups together, and then flowing fluid through said connected sections and spraying a different area than covered by the first-mentioned fluid flowing step.

WALTER O. BEYER.

References Cited in the file of this patent

UNITED STATES PATENTS

| Number | Name | Date |
| --- | --- | --- |
| 664,240 | Doehring | Dec. 18, 1900 |
| 738,271 | Astle | Sept. 8, 1903 |
| 757,338 | Nolting | Apr. 12, 1904 |
| 854,680 | Wiberg | May 21, 1907 |
| 1,429,756 | Mitchell | Sept. 19, 1922 |
| 1,460,154 | Frazier et al. | June 26, 1923 |
| 1,511,417 | McMullan | Oct. 14, 1924 |
| 1,601,199 | Clapper | Sept. 28, 1926 |
| 1,966,783 | Balaam | June 17, 1934 |
| 2,215,932 | Mowery | Sept. 24, 1940 |
| 2,259,453 | Beyer et al. | Oct. 21, 1941 |

FOREIGN PATENTS

| Number | Country | Date |
| --- | --- | --- |
| 75,923 | France | Apr. 3, 1867 |
| 348,330 | Germany | Feb. 6, 1922 |
| 371,312 | Germany | Mar. 13, 1923 |
| 482,182 | Germany | Sept. 9, 1929 |
| 601,884 | France | June 21, 1927 |